(12) United States Patent
Kurita

(10) Patent No.: US 9,120,352 B2
(45) Date of Patent: Sep. 1, 2015

(54) PNEUMATIC TIRE

(71) Applicant: BRIDGESTONE CORPORATION, Chuo-ku, Tokyo (JP)

(72) Inventor: Keiichi Kurita, Fuchu (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/372,305

(22) PCT Filed: Jan. 23, 2013

(86) PCT No.: PCT/JP2013/000304
§ 371 (c)(1),
(2) Date: Jul. 15, 2014

(87) PCT Pub. No.: WO2013/111576
PCT Pub. Date: Aug. 1, 2013

(65) Prior Publication Data
US 2014/0345770 A1    Nov. 27, 2014

(30) Foreign Application Priority Data

Jan. 24, 2012   (JP) .................................. 2012-012282

(51) Int. Cl.
*B60C 3/00*   (2006.01)
*B60C 15/024*  (2006.01)
*B60C 13/00*   (2006.01)
*B60C 13/02*   (2006.01)

(52) U.S. Cl.
CPC ................. *B60C 13/003* (2013.01); *B60C 3/00* (2013.01); *B60C 13/00* (2013.01); *B60C 13/02* (2013.01); *B60C 15/024* (2013.01)

(58) Field of Classification Search
CPC ................................ B60C 3/00; B60C 15/024
See application file for complete search history.

(56) References Cited

U.S. PATENT DOCUMENTS 4,693,290 A * 9/1987 Curtiss et al. ................. 152/450
8,656,969 B2 * 2/2014 Takahashi ..................... 152/153

FOREIGN PATENT DOCUMENTS

| EP | 581549 | * | 2/1994 |
| JP | 60-061305 A | | 4/1985 |
| JP | 2000-016036 A | | 1/2000 |
| JP | 2001-225618 A | | 8/2001 |
| JP | 2002-521253 A | | 7/2002 |
| JP | 2003-063217 A | | 3/2003 |

(Continued)

OTHER PUBLICATIONS

International Search Report for PCT/JP2013/000304 dated Apr. 16, 2013.

*Primary Examiner* — Justin Fischer
(74) *Attorney, Agent, or Firm* — Sughrue Mion, PLLC

(57) ABSTRACT

An angle of elevation ($\alpha$) of an intersection point (A), formed between a line (q) connecting intersection points (A, B) and a reference line (n) traversing a center of curvature (C) of an arc and parallel to the tire rotation axis, is from 40° to 60°, where a curve tracing the innermost region in the tire radial direction is approximated by the arc with the method of least squares, the intersection point (A) is an intersection point of the ply main body (6a) with a normal line (m) from the center of curvature (C) of the arc to a part of the ply main body (6a) convex outward in the tire width direction, and the intersection point (B) is an intersection point of the ply main body (6a) with the reference line (n). A radius of curvature of the arc is from 5 mm to 80 mm.

4 Claims, 6 Drawing Sheets

(56) References Cited

FOREIGN PATENT DOCUMENTS

| | | |
|---|---|---|
| JP | 2003-531057 A | 10/2003 |
| JP | 2004-535976 A | 12/2004 |
| JP | 2010-111370 A | 5/2010 |
| JP | 2011-088565 A | 5/2011 |
| WO | 2009/051260 A1 | 4/2009 |
| WO | WO 2010/013453 * | 2/2010 |

* cited by examiner (a)

(b)

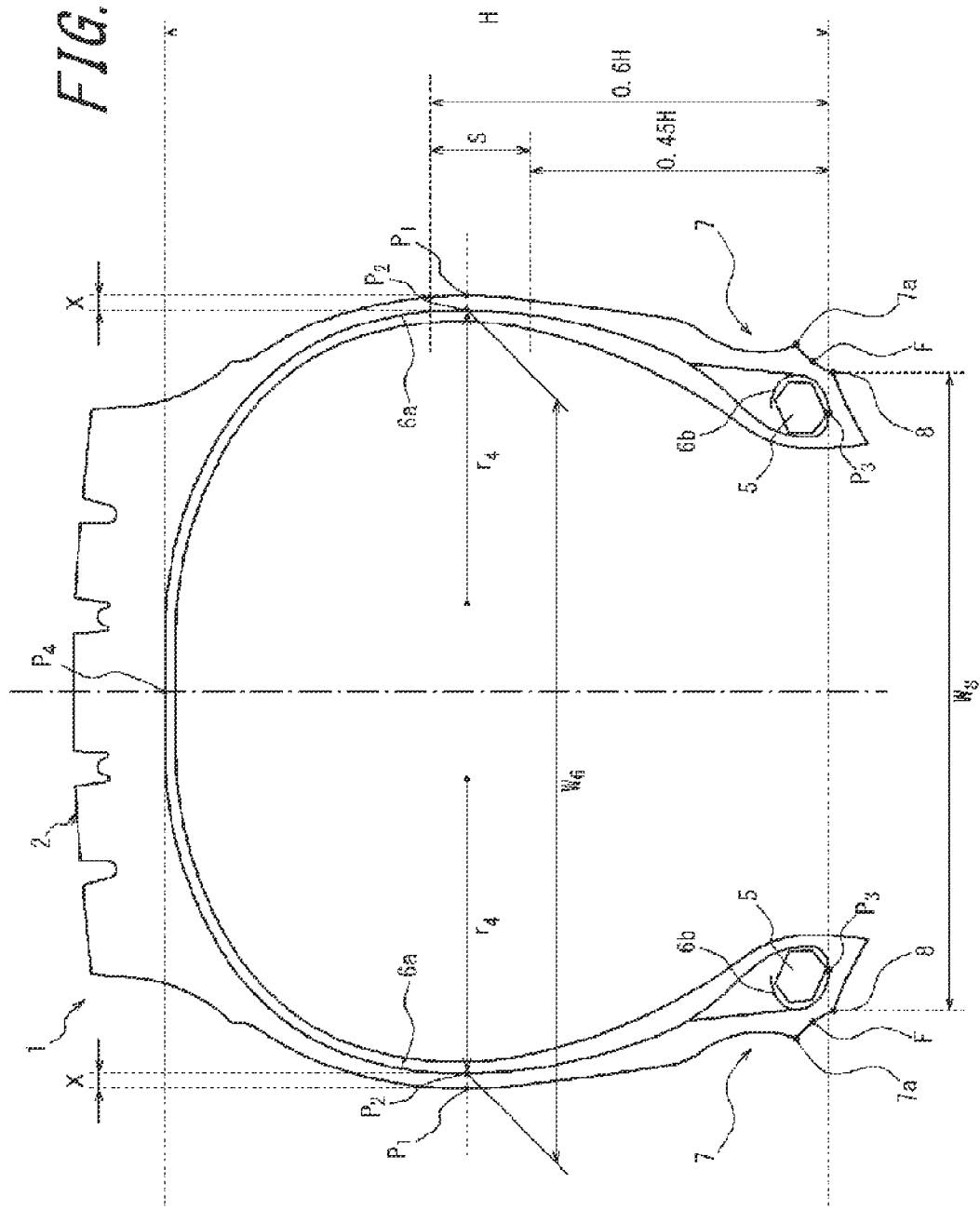

PNEUMATIC TIRE

CROSS REFERENCE TO RELATED APPLICATIONS

This application is a National Stage of International Application No. PCT/JP2013/000304 filed Jan. 23, 2013, claiming priority based on Japanese Patent Application No. 2012-012282 filed Jan. 24, 2012, the contents of all of which are incorporated herein by reference in their entirety.

TECHNICAL FIELD

The present invention relates to a reduced weight pneumatic tire provided with a recessed portion by hollowing out part of the side rubber near a bead portion.

BACKGROUND ART

In recent years, out of consideration for the environment and from an economical perspective, there has been a demand for improvement in the fuel efficiency of automobiles. Against this background, there is a desire to reduce the rolling resistance of tires. Therefore, the weight of the structural components and members of tires is being reduced.

In particular, one effective way of lowering the weight of the tire is to reduce the amount of rubber used. For example, it has been proposed to lower the height of the bead filler or to make the bead filler less thick. When reducing the amount of rubber used in the bead portion by using less bead filler, however, the rigidity of the bead portion degrades dramatically, making it difficult to guarantee steering stability.

On the other hand, with regard to the side rubber near the bead portion, where much rubber is used, Patent Literature 1 proposes hollowing out a recessed portion on the lateral surface of the tire in order to reduce the amount of rubber by the volume of the recessed portion and lower the weight of the tire.

CITATION LIST

Patent Literature

PTL 1: WO 2009/051260

SUMMARY OF INVENTION

In this structure, however, the rigidity near the recessed portion degrades, making it necessary to guarantee steering stability. With respect to this point, the technique disclosed in Patent Literature 1 attempts to maintain good steering stability by guaranteeing side rigidity through the further provision of one or more cord reinforcing layers on the outside of the carcass. This approach, however, may diminish the intended effect of reducing the weight of the tire.

Accordingly, while reducing the weight of the tire by providing a recessed portion in the side rubber near the bead portion, it is important simultaneously to maintain the steering stability at a high level.

It is therefore an object of the present invention to provide a pneumatic tire that makes reduced weight compatible with steering stability and durability.

Upon studying the cause of impaired steering stability in a pneumatic tire provided with a recessed portion in the side rubber near the bead portion, the inventor discovered that the main reason is that the side rigidity of the tire degrades, so that when a lateral force is applied to the tire, collapsing deformation of the sidewall portion starting at the recessed portion occurs more easily.

With regard to a method for guaranteeing a high level of steering stability in a pneumatic tire provided with a recessed portion in the side rubber near the bead portion, the inventor then discovered that from the perspective of suppressing the above-described collapsing deformation of the sidewall portion, the side rigidity of the tire can be guaranteed by setting the carcass line in accordance with the curvature of a circle that defines the outline of the recessed portion. In other words, the inventor completed the present invention through the discovery that by setting the carcass line in accordance with the curvature of the recessed portion, the resultant force with which the air inside the tire pushes the tire inner surface outward in the width direction increases in a region from the bead portion to the sidewall portion when the tire is filled with air, and the rigidity from the bead portion to the sidewall portion rises, thereby suppressing collapse of the sidewall portion.

In other words, a summary of the present invention is as follows.

A pneumatic tire including: a tread portion joined to a pair of sidewall portions and a pair of bead portions; a carcass including at least one ply formed by a ply main body and a wound portion, the ply main body extending toroidally between a pair of bead cores respectively embedded in the bead portions, and the wound portion extending from the ply main body and being wound around the bead cores from inside to outside in a tire width direction; and a recessed portion, recessed inward in the tire width direction, on a tire outer surface from a rim separation point to a tire maximum width position, wherein in a cross-section in the tire width direction in a rim unassembled state in which the tire is not assembled onto a rim, when an innermost region in a tire radial direction is defined as a range from an innermost point in the tire radial direction on the tire outer surface defining the recessed portion to a point 8 mm away in peripheral length outward in the tire radial direction along a periphery of the tire outer surface, an angle of elevation of an intersection point A, formed between a line connecting the intersection point A and an intersection point B and a reference line traversing a center of curvature C of an arc and parallel to a tire rotation axis, is from 40° to 60°, where a curve tracing the innermost region in the tire radial direction is approximated by the arc with the method of least squares, the intersection point A is an intersection point of the ply main body with a normal line from the center of curvature C of the arc to a part of the ply main body convex outward in the tire width direction, and the intersection point B is an intersection point of the ply main body with the reference line, and a radius of curvature of the arc is from 5 mm to 80 mm.

According to the present invention, it is possible to provide a pneumatic tire that, while achieving sufficiently reduced weight by providing a recessed portion in the side rubber near the bead portion, guarantees excellent steering stability and durability.

BRIEF DESCRIPTION OF DRAWINGS

The present invention will be further described below with reference to the accompanying drawings, wherein:

FIG. 5 is a cross-sectional diagram in the tire width direction of the pneumatic tire according to the present invention.

DESCRIPTION OF EMBODIMENTS

Figure 1:
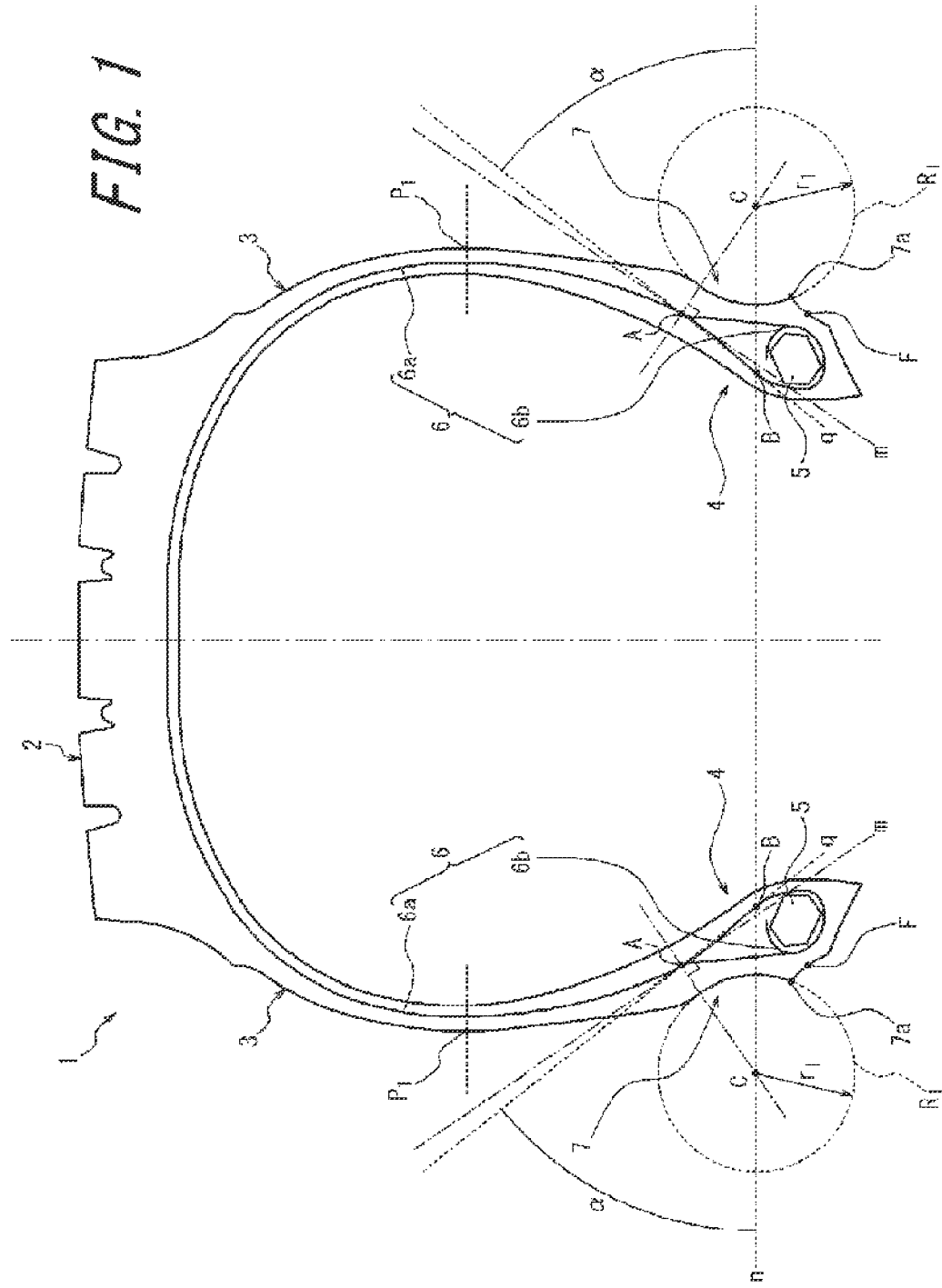
FIG. 1 is a cross-sectional diagram in the tire width direction of a pneumatic tire according to the present invention.
Figure 2:
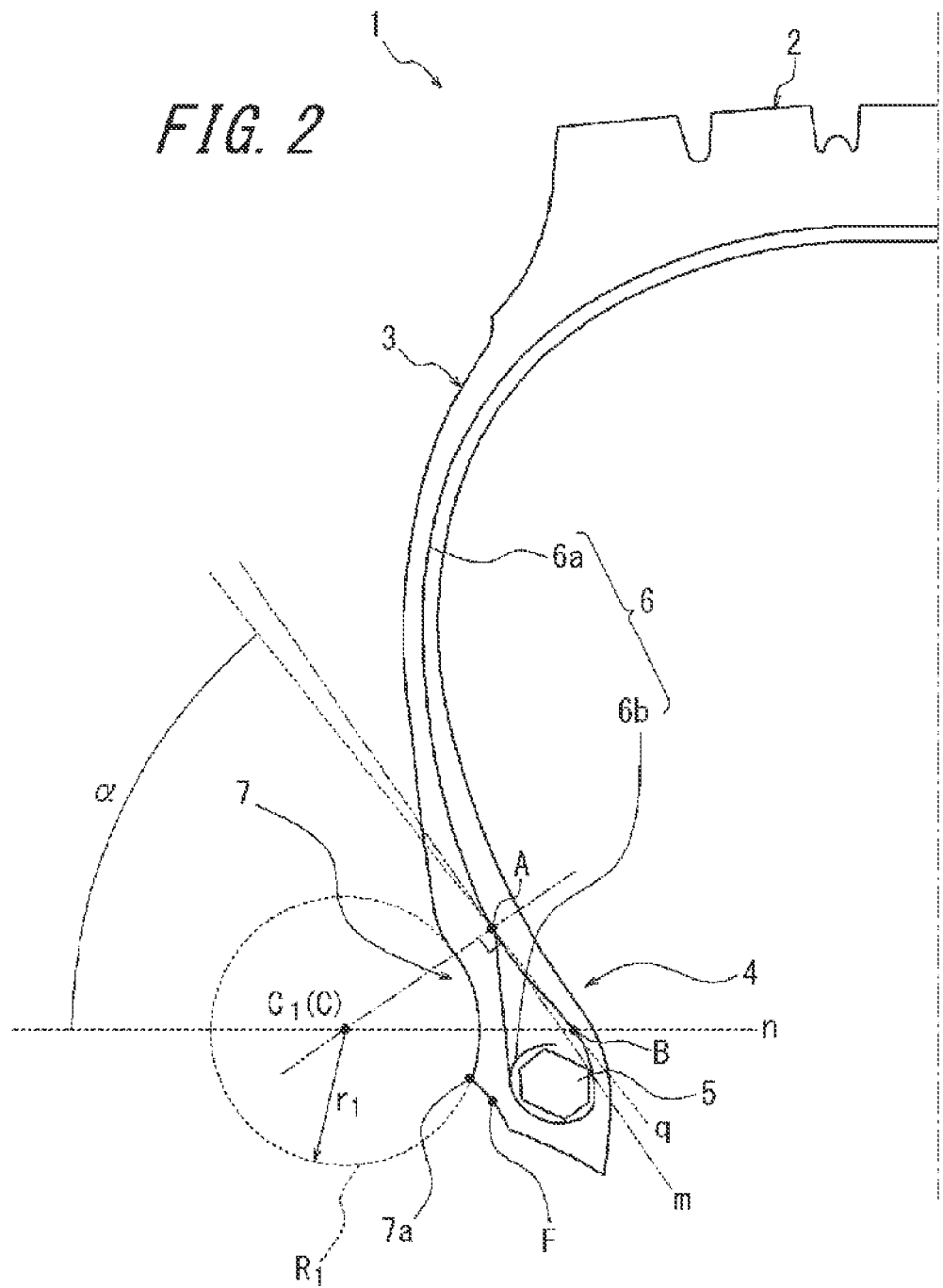
FIG. 2 illustrates half of a cross-sectional diagram in the tire width direction of the pneumatic tire according to the present invention illustrated in FIG. 1.
Figure 3A:
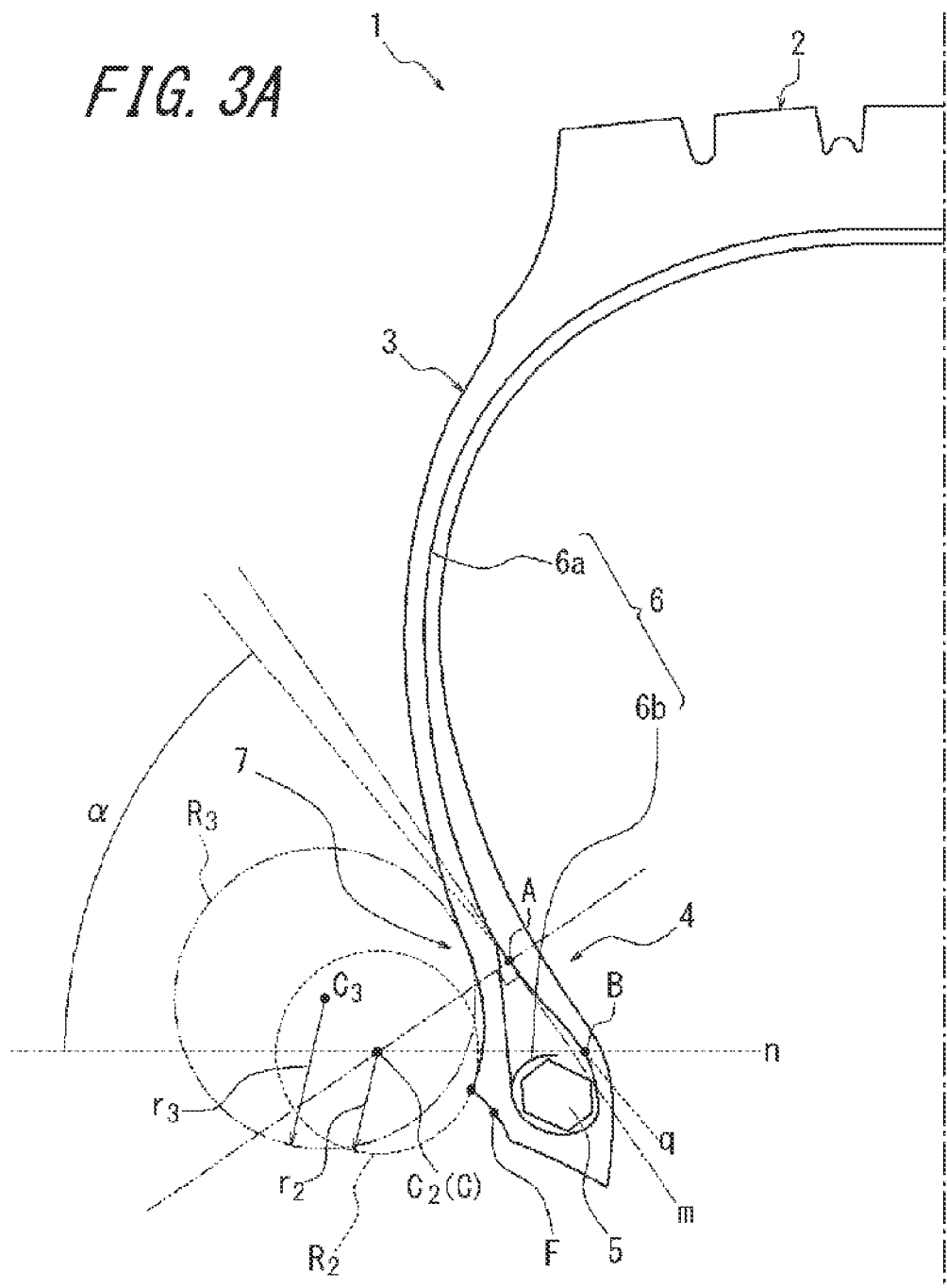
FIG. 3A illustrates half of a cross-sectional diagram in the tire width direction of the pneumatic tire according to the present invention, with a recessed portion defined by a plurality of arcs.
Figure 3B:
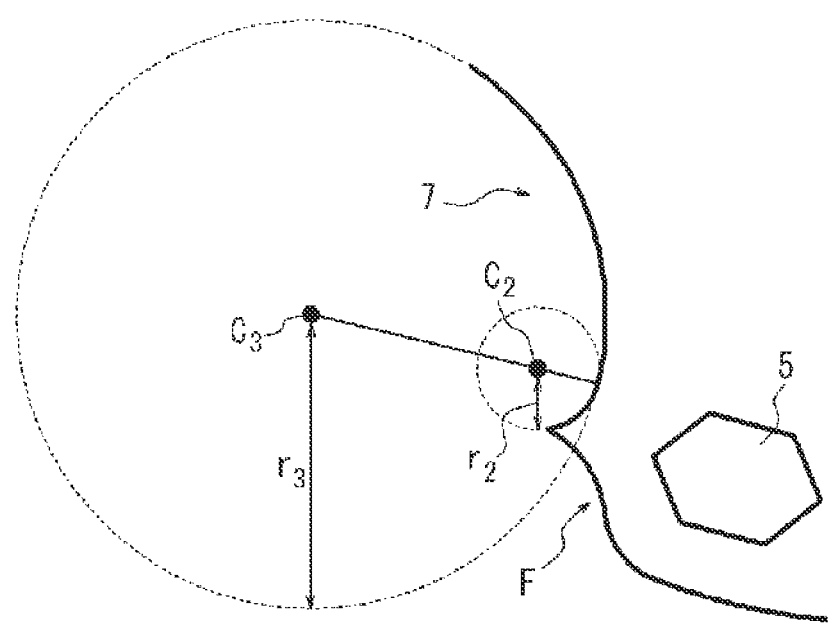
FIG. 3B is a schematic, partial cross-sectional diagram in the tire width direction of the pneumatic tire according to the present invention, with a recessed portion defined by a plurality of arcs.
Figure 4:
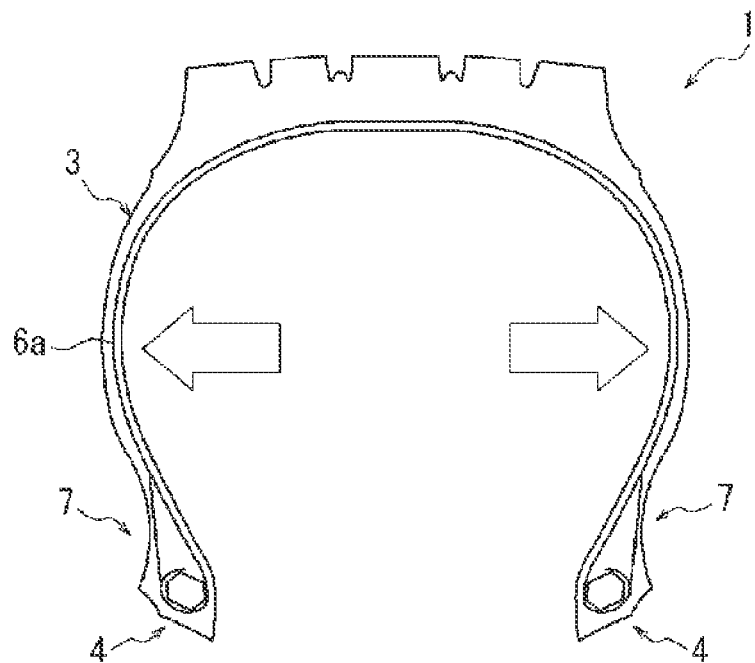
FIG. 4 illustrates the resultant force of air on the tire inner surface, outward in the tire width direction from inside the tire, when internal pressure is applied, with (a) illustrating the pneumatic tire according to the present invention, and (b) illustrating a conventional pneumatic tire.
Figure 4:
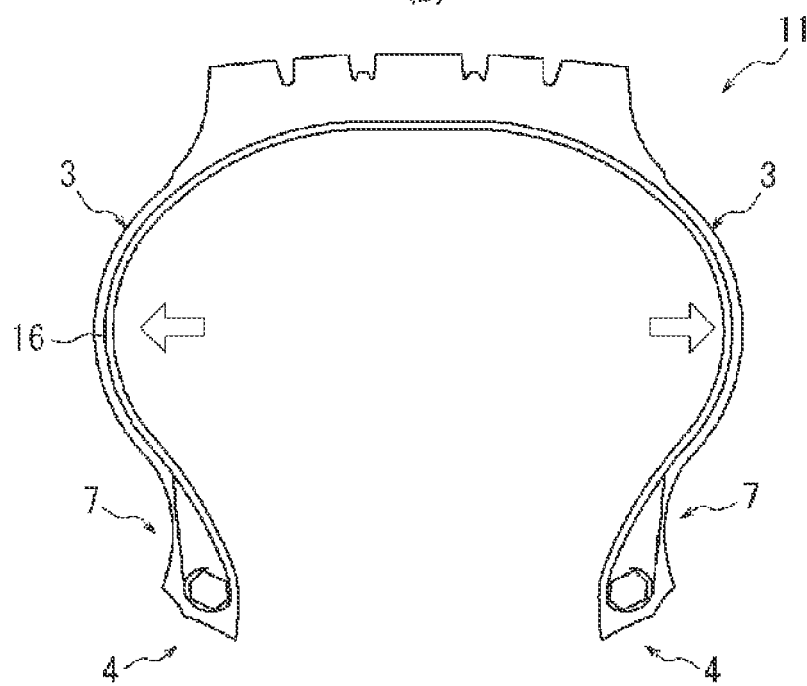

With reference to the drawings, the following describes a pneumatic tire according to the present invention in detail. FIG. 1 is a cross-sectional diagram in the tire width direction of the pneumatic tire according to the present invention. FIG. 2 illustrates half of a cross-sectional diagram in the tire width direction of the pneumatic tire according to the present invention illustrated in FIG. 1. FIG. 3A illustrates half of a cross-sectional diagram in the tire width direction of the pneumatic tire according to the present invention, with a recessed portion defined by a plurality of arcs. FIG. 3B is a schematic, partial cross-sectional diagram in the tire width direction of the pneumatic tire according to the present invention, with a recessed portion defined by a plurality of arcs. FIG. 4 illustrates the resultant force of air on the tire inner surface, outward in the tire width direction from inside the tire, when internal pressure is applied, with (a) illustrating the pneumatic tire according to the present invention, and (b) illustrating a conventional pneumatic tire. FIG. 5 is a cross-sectional diagram in the tire width direction of the pneumatic tire according to the present invention.

FIG. 1 is a cross-sectional diagram in the tire width direction of a pneumatic tire 1 according to the present invention (hereinafter referred to as the "tire") in a rim unassembled state in which the tire is not assembled onto a rim.

The tire 1 is provided with a tread portion 2, a pair of sidewall portions 3, 3, and a pair of bead portions 4, 4. The tire 1 is also provided with a carcass 6 including at least one ply formed by a ply main body 6a and a wound portion 6b, the ply main body 6a extending toroidally between a pair of bead cores 5, 5 respectively embedded in the bead portions 4, 4, and the wound portion 6b extending from the ply main body 6a and being wound around the bead cores 5, 5 from the inside to the outside in the tire width direction.

The tire 1 also includes a recessed portion 7 within a tire radial region from a rim separation point F to a tire maximum width position $P_1$ on the sidewall portion 3. When the tire 1 is assembled onto an applicable rim, standard maximum internal pressure specified in accordance with the tire size is applied, and no load is applied, then the rim separation point F refers to the point at which the lateral surface of the tire separates from a state of contact with the rim flange. An applicable rim refers to a rim specified in accordance with the tire size by valid industrial standards for the region in which the tire is produced or used, such as the "JATMA (Japan Automobile Tyre Manufacturers Association) Year Book" in Japan, the "ETRTO (European Tyre and Rim Technical Organisation) Standard Manual" in Europe, and the "TRA (Tire and Rim Association, Inc.) Year Book" in the United States of America. The tire maximum width position $P_1$ of the sidewall portion 3 refers to the outermost edge of the sidewall portion 3 in the tire width direction. The recessed portion 7 is provided so as to be entirely included on the tire outer surface in the tire radial region between the rim separation point F and the tire maximum width position $P_1$ and is formed by hollowing out the tire 1 to create a recess inward in the tire width direction. In other words, the recessed portion is formed by at least one arc, the center of which is outward in the width direction from the outer surface of the sidewall portion and which protrudes inward in the width direction as viewed from the center.

The shape of the recessed portion 7 has a center C further outward in the tire width direction than the side rubber constituting the sidewall portion 3 and is defined by an arc of a single circle or a combination of arcs of a plurality of circles.

FIG. 2 illustrates half of the tire 1 illustrated in FIG. 1. In this example, the shape of the recessed portion 7 is defined by forming an arc of a circle $R_1$ having a center $C_1$ and a radius of curvature $r_1$ of 50 mm.

On the other hand, in the example in FIG. 3A, the shape of the recessed portion 7 is defined by forming two arcs: an arc of a circle $R_2$ having a center $C_2$ and a radius of curvature $r_2$ of 30 mm, and an arc of a circle $R_3$ having a center $C_3$ and a radius of curvature $r_3$ of 400 mm.

In the example illustrated in FIG. 3B, a circle $R_2$ having a center $C_2$ is inscribed in a circle $R_3$ having a center $C_3$, and the shape of the recessed portion 7 is thus defined by a combination of arcs of a plurality of circles.

Note that in FIGS. 2 and 3A, the rim separation point F is separate from the recessed portions 7 respectively defined by the circles $R_1$ and $R_2$, i.e. the outer surface is also present between the rim separation point F and the circles $R_1$ or $R_2$ (i.e. the outer surface is present between the rim separation point F and the below-described innermost edge 7a of the recessed portion 7 in the tire radial direction), and the outer surface is depicted as curving towards the inside of the tire. In the present invention, this outer surface is not included in the recessed portion 7.

In this context, an innermost region of the recessed portion in a tire radial direction is defined as a range from an innermost point 7a in the tire radial direction of the recessed portion 7 to a point 8 mm away in peripheral length outward in the tire radial direction along the periphery of the recessed portion 7. When a curve defining the innermost region of the recessed portion 7 in the tire radial direction is approximated by an arc with the method of least squares, it is essential in the tire according to the present invention that the radius of curvature r of the arc be from 5 mm to 80 mm.

The reason is that if the radius of curvature r is less than 5 mm, then the curvature is too large, and compressive stress occurring due to deflection of the tire easily becomes concentrated, which may lead to wrinkles or cracks in the rubber on the surface. Conversely, if the radius of curvature exceeds 80 mm, then the curvature is small, making it difficult to hollow out sufficient side rubber in the region from the rim separation point F to the tire maximum width position $P_1$.

By thus providing the recessed portion 7 in the side rubber region from the rim separation point F to the tire maximum width position $P_1$, an amount of rubber material equal to the volume of the recessed portion 7 can be omitted, thereby lowering the weight of the tire and consequently lowering the rolling resistance of the tire.

In the present invention, in addition to the above structure, it is essential that an angle of elevation α of an intersection point A, formed between a line q connecting the intersection point A and an intersection point B and a reference line n that traverses the center of curvature C of an arc and is parallel to the tire rotation axis, be from 40° to 60°, where a curve defining the innermost region of the recessed portion 7 in the tire radial direction is approximated by the arc with the method of least squares, the intersection point A is an intersection point of the ply main body 6a with a normal line m from the center of curvature C of the arc to a part of the ply main body 6a convex outward in the tire width direction, and the intersection point B is an intersection point of the ply main body 6a with the reference line n.

Here, the center of curvature C is the center $C_1$ of the circle $R_1$ in the example illustrated in FIG. 2 and is the center $C_2$ of the circle $R_2$ in the example illustrated in FIG. 3A.

As described above, when the recessed portion 7 is provided in the side rubber from the rim separation point F to the tire maximum width position $P_1$, the weight of the tire can be reduced. On the other hand, the side rigidity of the tire degrades, causing degradation of the steering stability. In other words, by forming the recessed portion 7, the rigidity from the bead portion to the sidewall portion degrades, making it easier for the tire shape to change particularly when a lateral force is applied. As a result, balance is lost in the tire width direction, leading to degradation of the steering stability.

Therefore, in a pneumatic tire having a recessed portion in the side rubber near the bead portion, the present invention improves the side rigidity of the tire and achieves good steering stability by setting the angle of elevation α of the intersection point A, formed between the reference line n and the line q connecting the intersection points A and B and measured from the center of curvature C, to be from 40° to 60°. As illustrated in FIG. 4(a), the ply main body 6a of the carcass extending from the bead portion 4 to the sidewall portion 3 has a larger rising angle from the tire rotation axis and a smaller curvature of the carcass line from the bead portion to the sidewall portion than the ply main body 16a of the carcass in the conventional pneumatic tire 11 illustrated in FIG. 4(b). In other words, when the tire 1 is filled with air, the proportion of the component, within the internal pressure, facing outward in the tire width direction in the region from the bead portion to the sidewall portion becomes greater than in a conventional tire, and since the resultant force of air within the tire pushing the tire inner surface outward in the tire width direction increases, the side rigidity of the tire increases. As a result, even when the recessed portion 7 is provided in the side rubber, collapsing deformation of the sidewall portion 3 in the tire 1 can be suppressed, on the whole allowing for a guarantee of good steering stability.

When setting the angle of elevation α, it is essential that the above center of curvature C be used as a reference. The reason is that when providing a recessed portion in the bead portion in order to reduce weight, the sidewall collapses in such a way that the bead portion including the intersection point A deforms towards the center of curvature C, centering on the intersection point B.

The reason for thus setting the angle of elevation α of the intersection point A, formed between the reference line n and the line q connecting the intersection points A and B, to be from 40° to 60° is that the curvature of the tire inner surface in the region from the rim separation point F to the tire maximum width position $P_1$ on the sidewall portion 3 decreases and the resultant force pushing this region outward in the width direction from inside the tire increases sufficiently, allowing for an increase in the side rigidity. Conversely, if the angle of elevation α exceeds 60°, durability may be affected due to heat buildup in the bead portion. Furthermore, if the angle of elevation α exceeds 60°, it becomes necessary to increase the radius of curvature of the carcass near an area below the belt edge in order to guarantee a cross-sectional shape that effectively suppresses collapse of the sidewall portion upon application of internal pressure. In this case, however, the only portion where the carcass and the belt are in contact is near the center of the tire, and due to repeated input of a lateral force, separation may occur at this portion.

In the present invention, it is essential that the carcass 6 include wound portions 6b, 6b wound around the bead cores 5, 5 from the inside to the outside in the tire width direction.

By thus winding the carcass 6 around the bead core 5, the starting position of the arc drawn by the center of curvature C can be brought closer to the rim separation point F, thus greatly contributing to a reduction in the use of rubber and making it difficult for the carcass 6 to be pulled out.

The angle of elevation α of the intersection point A, formed between the line q and the reference line n, is preferably from 50° to 60°.

The reason is that by setting the angle of elevation α within the above numerical range, the resultant force pushing the region from the rim separation point F to the tire maximum width position $P_1$ of the sidewall portion 3 outward in the width direction from inside the tire increases sufficiently, allowing for an improvement in side rigidity. As a result, even better steering stability can be achieved.

As illustrated in FIG. 5, the maximum width $W_6$ of the carcass 6 in the tire width direction is preferably 115% to 135% of the inter-bead heel distance $W_8$ between a pair of bead heels 8, 8, and an outermost edge $P_2$ of the carcass in the tire width direction is preferably located within a tire radial region S between a tire radial position outward in the tire radial direction a distance of 45% of the height H of the carcass from the innermost edge $P_3$ of the carcass 6 in the tire radial direction and a tire radial position outward in the tire radial direction a distance of 60% of the height H of the carcass from the innermost edge $P_3$ of the carcass 6 in the tire radial direction.

The reason is that if $W_6$ exceeds 135% of $W_8$, more of the bead portion runs onto the rim flange, which may worsen the bead durability, whereas if $W_6$ is less than $W_8$, the air volume of the tire decreases, leading to a reduction in the load capability of the tire that may cause a problem with durability of the entire tire.

The maximum width $W_6$ of the carcass 6 in the tire width direction is the distance in the tire width direction between the outermost edges $P_2$, $P_2$ of the ply main bodies 6a, 6a in the tire width direction. The inter-bead heel distance $W_8$ is the distance in the tire width direction between the bead heels 8, 8 of the pair of bead portions 4, 4 and corresponds to the width of an applicable rim as listed in the above-described standards of JATMA or the like. The height H of the carcass is the distance in the tire radial direction between a line parallel to the tire rotation axis and traversing the innermost edge $P_3$ in the tire radial direction and a line parallel to the tire rotation axis and traversing the outermost edge $P_4$ in the tire radial direction.

While FIG. 5 illustrates an example in which the carcass 6 is formed from one ply, the dimensions specified by the carcass are measured from the cord center of the ply main body of the carcass unless otherwise noted.

Furthermore, while not illustrated, when the carcass 6 is formed from a plurality of plies, the dimensions specified above are along a virtual carcass centerline, which is a line traversing the center in the width direction between the cord centerline of the ply main body of the carcass furthest inward in the tire width direction and the cord centerline of the ply main body of the carcass furthest outward in the tire width direction.

By thus increasing the rising angle, from a line parallel to the tire rotation axis, of the ply main body 6a of the carcass extending from the bead portion 4 to the sidewall portion 3, the side rigidity of the tire can be improved, and good steering stability can be guaranteed, as described above.

From the above perspective, the aspect ratio of the pneumatic tire 1 according to the present invention is preferably from 60 to 80. Furthermore, in a state in which the tire is assembled onto an applicable rim and maximum air pressure is applied, the outline of the carcass 6a at the outermost edge $P_2$ in the tire width direction is preferably defined by an arc having a radius of curvature $r_4$ of 50 mm to 120 mm.

As illustrated in FIG. 5, the thickness x of the sidewall portion 3 is preferably constant in a region S in the tire radial direction between a tire radial position outward in the tire radial direction a distance of 45% of the height H of the carcass from the innermost edge $P_3$ of the carcass in the tire radial direction and a tire radial position outward in the tire radial direction a distance of 60% of the height H of the carcass from the innermost edge $P_3$ of the carcass in the tire radial direction, and in the region S, the thickness x of the sidewall portion 3 is preferably from 3.0 mm to 5.0 mm.

In this context, the thickness x of the sidewall portion is the minimum distance from the cord center of the ply main body 6a in the sidewall portion 3 to the tire outer surface. Specifically, with reference to FIG. 5, the thickness x is the distance from the outermost edge $P_2$ in the tire width direction of the ply main body 6a of the carcass to the intersection point between the normal line to the ply main body 6a and the tire outer surface, here the tire maximum width position $P_1$.

In the tire according to the present invention, as illustrated in FIG. 4(a), the proportion of the component, within the internal pressure, facing outward in the tire width direction is greater than in a conventional tire. Accordingly, by setting the sidewall portion to be a constant thickness in the region S, the force outward in the tire width direction can be received evenly. As a result, better steering stability can be achieved. Note that when taking into consideration stable reception of the force due to internal pressure and degradation of durability due to damage from the outside or heat buildup, the thickness x of the sidewall portion 3 in the region S is preferably from 3.0 mm to 5.0 mm.

The innermost edge 7a of the recessed portion 7 in the tire radial direction is preferably located within a tire radial region between a tire radial position at the rim separation point F and a tire radial position outward in the tire radial direction a distance of 10 mm from the rim separation point F.

By setting the innermost edge 7a to be within a range of 0 mm to 10 mm from the rim separation point F outward in the tire radial direction, the amount of rubber used around the bead can be sufficiently reduced, thereby allowing for a reduction in weight while maintaining suitable tire rigidity.

EXAMPLES

Next, Inventive Example Tires 1 to 3 were produced to have a tire size of 275/80R22.5, and as illustrated in FIG. 1, to have a recessed portion within the region from the rim separation point to the tire maximum width position, the angle of elevation of the intersection point A being from 40° to 60°. The specifications were as listed in Table 1.

Comparative Example Tires 1 to 6 were also produced to have a similar recessed portion as Inventive Example Tire 1 and to have the specifications listed in Table 1. Note that the amount of reduction in tire weight (kg) is the amount of reduction from a tire not having the recessed portion, i.e. the rubber weight (kg) corresponding to the recessed portion.

TABLE 1

|  | Inventive Example Tire 1 | Inventive Example Tire 2 | Inventive Example Tire 3 | Comparitive Example Tire 1 | Comparitive Example Tire 2 | Comparitive Example Tire 3 | Comparitive Example Tire 4 | Comparitive Example Tire 5 | Comparitive Example Tire 6 | Conventional Tire |
|---|---|---|---|---|---|---|---|---|---|---|
| Radius of curvature of arc (mm) | 20 | 40 | 60 | 80 | 5 | 100 | 40 | 60 | 60 | N/A |
| Angle of elevation α (°) | 40 | 50 | 40 | 50 | 50 | 55 | 50 | 40 | 40 | 55 |
| Maxiumum width of $W_6$ of carcass in tire width direction (mm) | 268 | 268 | 268 | 268 | 268 | 268 | 268 | 240 | 285 | 285 |
| Inter-bead heel distance $W_8$ (mm) | 210 | 210 | 210 | 210 | 210 | 210 | 210 | 210 | 210 | 210 |
| $W_6/W_8$ | 1.28 | 1.28 | 1.28 | 1.28 | 1.28 | 1.28 | 1.28 | 1.14 | 1.36 | 1.36 |
| Separation position of $P_2$ from $P_3$ | 57 | 50 | 50 | 56 | 50 | 56 | 50 | 50 | 52 | 50 |
| Thickness x of side wall portion (mm) | 4 | 4 | 4 | 4 | 4 | 4 | 2 | 4 | 4 | 5 |

The Inventive Example Tires 1 to 3 and Comparative Example Tires 1 to 6 were assembled onto a rim with a rim size of 8.25×22.5 and a rim width of 8.25 inches (21.0 cm) and mounted onto a vehicle, with an internal pressure of 900 kPa. Steering stability and durability were assessed by performing the experiment below.

<Steering Stability Assessment>

When driving on a test course in fair weather with the above tires mounted on the vehicle, the test driver comprehensively performed a feeling assessment of the performance for braking, acceleration, straight running, and cornering. The assessment results are listed in Table 2. The assessment in Table 2 is represented as an index, with the results for Comparative Example Tire 1 as 100. A larger value indicates better steering stability.

<Durability Assessment>

After filling the tires with oxygen (oxygen concentration of 90% or more) and assembling onto rims of the above size, the tires were aged by storage for 60 days in a constant temperature room at 60° C. and then attached to a drum test machine. At 110% (3575 kg) of the load specified by JATMA and a test speed of 60 km/h, a slip angle was applied such that the side force became 0.3 G (975 kg), and in this state, the tire was repeatedly rolled on the 1.7 m diameter drum test machine. The results for the durability assessment shown in Table 1 were obtained by measuring the driving distance until a crack occurred and progressed from the recessed portion during the process of repeated rolling. The measurement was then converted to an index. The assessment in Table 2 is an index, with the results for Comparative Example Tire 1 as 100. A larger value indicates better durability.

TABLE 2

|  | Inventive Example Tire 1 | Inventive Example Tire 2 | Inventive Example Tire 3 | Comparative Example Tire 1 | Comparative Example Tire 2 | Comparative Example Tire 3 | Comparative Example Tire 4 | Comparative Example Tire 5 | Comparative Example Tire 6 | Conventional Tire |
|---|---|---|---|---|---|---|---|---|---|---|
| Weight reduction ratio | 80 | 86 | 80 | 88 | 97 | 97 | 86 | 80 | 80 | 100 |
| Steering stability | 105 | 105 | 105 | 100 | 100 | 95 | 105 | 105 | 100 | 100 |
| Durability | 100 | 100 | 100 | 100 | 100 | 110 | 90 | 85 | 105 | 100 |
| Resititance to external damage | 100 | 100 | 100 | 100 | 100 | 100 | 95 | 100 | 95 | 100 |

From the results in Table 2, it is clear that in a pneumatic tire having a recessed portion within the region from the rim separation point to the tire maximum width position, good steering stability can be obtained when the angle of elevation α of the intersection point A is from 40° to 60°. Is was also clear that upon the angle of elevation α of the intersection point A exceeding 60°, failure occurs by the bead filler cracking. Furthermore, it was clear that resistance to external damage could be guaranteed by setting the thickness x of the sidewall portion in the width direction to be from 3.0 mm to 5.0 mm.

INDUSTRIAL APPLICABILITY

According to the present invention, it is possible to provide a pneumatic tire that guarantees excellent steering stability and durability while achieving sufficiently reduced weight.

REFERENCE SIGNS LIST

1: Pneumatic tire
2: Tread portion
3: Sidewall portion
4: Bead portion
5: Bead core
6: Carcass
6a: Ply main body
6b: Wound portion
7: Recessed portion
7a: Innermost edge of the recessed portion 7 in the tire radial direction
8: Bead heel
A: Intersection point of the normal line m and the ply main body 6a
B: Intersection point of the reference line n and the ply main body 6a
C: Center of curvature
F: Rim separation point
$W_6$: Maximum width of the carcass 6 in the tire width direction
$W_8$: Width of bead heels 8 in the tire width direction
H: Height of carcass
r: Radius of curvature
m: normal line from the center of curvature C to a part of the ply main body 6a convex outward in the tire width direction
n: Reference line traversing the center of curvature C and parallel to the tire rotation axis
q: Line connecting intersection points A and B
α: angle of elevation of intersection point A, formed between the line q and the reference line n

The invention claimed is:

1. A pneumatic tire comprising:
a tread portion joined to a pair of sidewall portions and a pair of bead portions;
a carcass including at least one ply formed by a ply main body and a wound portion, the ply main body extending toroidally between a pair of bead cores respectively embedded in the bead portions, and the wound portion extending from the ply main body and being wound around the bead cores from inside to outside in a tire width direction; and
a recessed portion, recessed inward in the tire width direction, and extending annularly around a whole circumference of the tire on a tire outer surface from a rim separation point to a tire maximum width position, wherein
in a cross-section in the tire width direction in a rim unassembled state in which the tire is not assembled onto a rim, when an innermost region in a tire radial direction is defined as a range from an innermost point in the tire radial direction on the tire outer surface defining the recessed portion to a point 8 mm away in peripheral length outward in the tire radial direction along a periphery of the tire outer surface, an angle of elevation of an intersection point A, formed between a line connecting the intersection point A and an intersection point B and a reference line traversing a center of curvature C of an arc and parallel to a tire rotation axis, is from 40° to 60°, where a curve tracing the innermost region in the tire radial direction is approximated by the arc with the method of least squares, the intersection point A is an intersection point of the ply main body with a normal line from the center of curvature C of the arc to a part of the ply main body convex outward in the tire width direction, and the intersection point B is an intersection point of the ply main body with the reference line, and a radius of curvature of the arc is from 5 mm to 80 mm.

2. The pneumatic tire according to claim 1, wherein in the rim unassembled state, a maximum width of the carcass in the tire width direction is 115% to 135% of a distance between a pair of bead heels, and an outermost edge of the carcass in the tire width direction is located within a tire radial region between a tire radial position outward in the tire radial direction a distance of 45% of a height of the carcass from an innermost edge of the carcass in the tire radial direction and a tire radial position outward in the tire radial direction a distance of 60% of the height of the carcass from the innermost edge of the carcass in the tire radial direction.

3. The pneumatic tire according to claim 1, wherein in the rim unassembled state, an innermost edge of the recessed portion in the tire radial direction is located within a tire radial region between a tire radial position at the rim separation point and a tire radial position outward in the tire radial direction a distance of 10 mm from the rim separation point.

4. The pneumatic tire according to claim 1, wherein when a thickness of the sidewall portion is a minimum distance from a cord center of the ply main body in the sidewall portion to the tire outer surface, in the rim unassembled state the thickness of the sidewall portion is constant in a tire radial region between a tire radial position outward in the tire radial direction a distance of 45% of a height of the carcass from an innermost edge of the carcass in the tire radial direction and a tire radial position outward in the tire radial direction a distance of 60% of the height of the carcass from the innermost edge of the carcass in the tire radial direction, and in the tire radial region, the thickness of the sidewall portion is from 3.0 mm to 5.0 mm.

* * * * *